Nov. 27, 1951 M. D. McCOY 2,576,886
VINE CUTTING AND WINDROWING ATTACHMENT
Filed July 10, 1948 2 SHEETS—SHEET 1

Inventor
Millard D. McCoy
By Fishburn & Mullendore
Attorneys,

Nov. 27, 1951 M. D. McCOY 2,576,886
VINE CUTTING AND WINDROWING ATTACHMENT
Filed July 10, 1948 2 SHEETS—SHEET 2
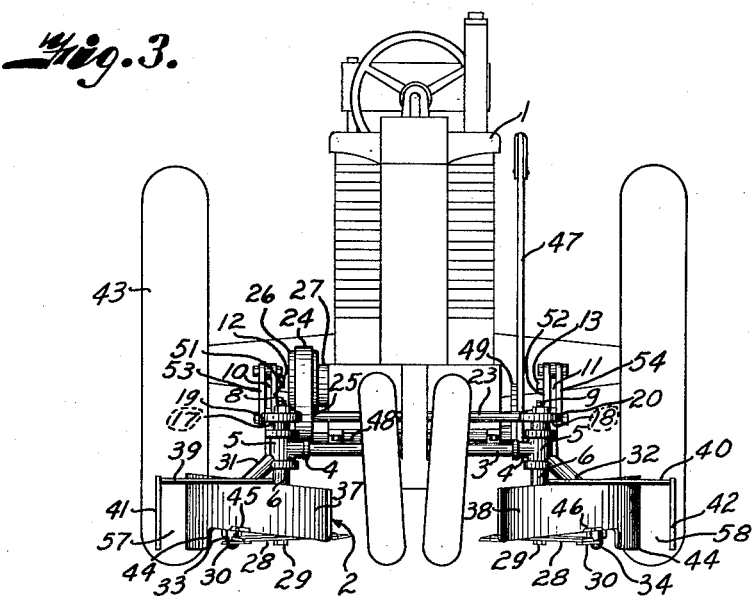
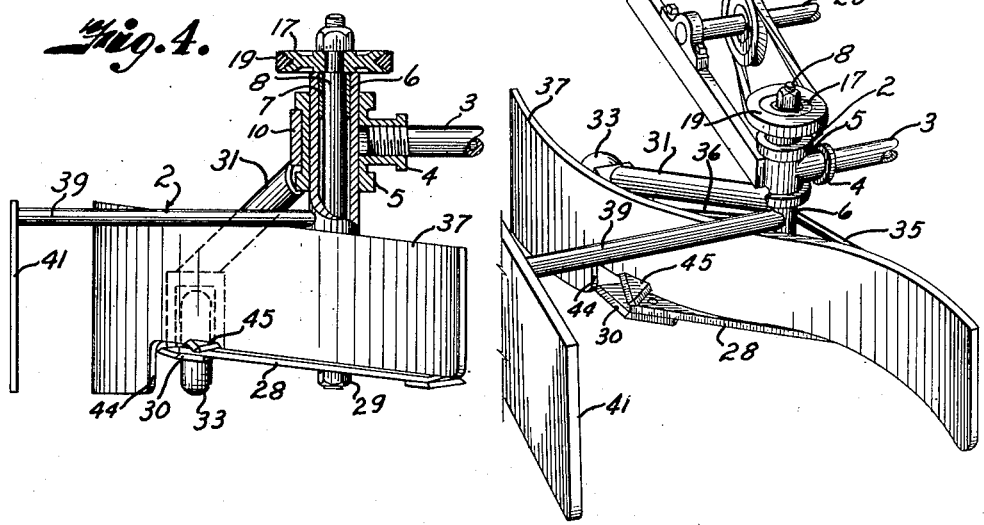
Inventor
Millard D. McCoy

Patented Nov. 27, 1951

2,576,886

UNITED STATES PATENT OFFICE 2,576,886

VINE CUTTING AND WINDROWING ATTACHMENT

Millard D. McCoy, Kansas City, Kans.

Application July 10, 1948, Serial No. 38,100

3 Claims. (Cl. 55—62)

This invention relates to vine cutters, and more particularly to a device for attachment to a tractor for cutting the vines of potatoes and the like and removing the vines to the space between the rows.

The principal object of the present invention is to provide a device of this character having cutting blades to cut the vines in parallel rows of potatoes or the like and move the vines outwardly to the center between the rows so that tractor wheels will move over the vines and mash them down out of the way for a potato digger attached to the rear of the tractor.

Other objects of the present invention are to provide a vine-cutting attachment for a tractor which is pivotally mounted on the tractor so the cutting blades may be raised and lowered to accommodate the device to different levels of ground; to provide a mounting for the blade so that the blade will be in a slightly forwardly tilting position; to provide guide means for the vines after they have been severed; to provide a baffle cooperating with the vine-guiding means to guide the vines between the rows so that they may be contacted by the wheels of the tractor and to provide a device of this character particularly adapted for cutting potato vines whereby the vines will be moved to the space between the rows and a potato digger may pass along the rows and dig said potatoes without the vines or tops clogging or interfering with the operation of the digger.

Further objects of the invention are to provide a cutter for preventing the vines from wrapping around the shaft mounting the cutting blades and to provide a device which may be carried by the tractor propelling the potato digger.

In accomplishing these and other objects of the present invention I have provided improved details of structure, the preferred forms of which are illustrated in the accompanying drawings, wherein:

Fig. 3 is a front elevational view of the device attached to a tractor.

Fig. 4 is an elevational view partly in cross section particularly illustrating the shaft mounting the cutter and the guide means.

Fig. 5 is an elevational view particularly illustrating one of the cutters and its shaft and the guide and baffle for rowing the vines after they have been cut.

Figure 1:
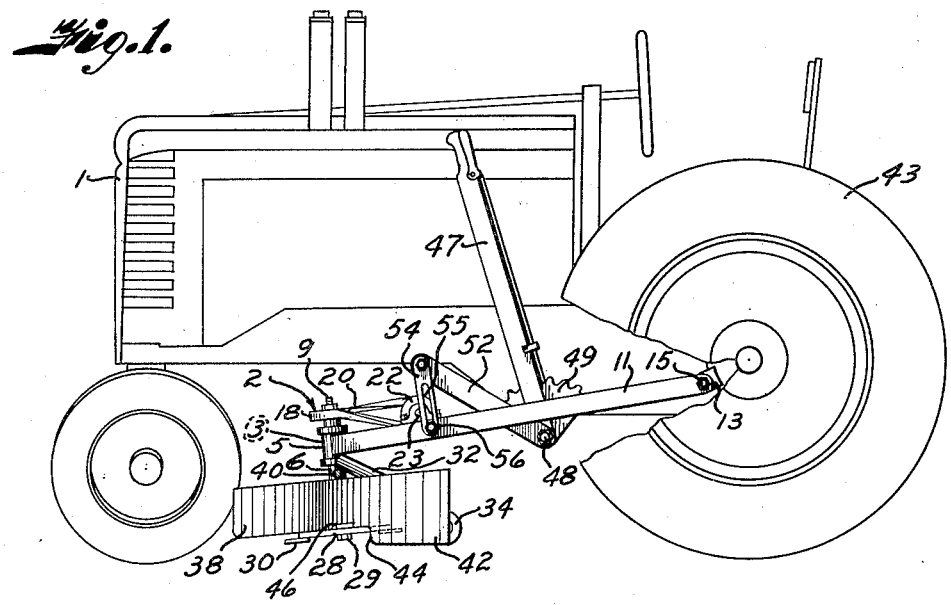
Fig. 1 is a side view of the vine-cutting device showing its attachment to a tractor.

Referring more in detail to the drawings:

1 designates a tractor upon which is mounted the vine-cutting device as indicated at 2 which consists of a frame having a horizontal member or bar 3 extending transversely of the tractor and underneath thereof between the front and rear wheels as best illustrated in Fig. 1. The ends of the bar are threaded and adapted to receive threaded nipples 4 of collars 5 adapted to receive sleeves or housings 6 extending vertically therethrough and having suitable bearings 7 for shafts 8 and 9. Rigidly secured to the collars 5 by welding or suitable means and extending rearwardly of the collars are arms 10 and 11 pivotally mounted to brackets 12 and 13 by bolts or the like 14 and 15 to the rear axial housing 16 of the tractor 1 as best illustrated in Fig. 2.

Figure 2:
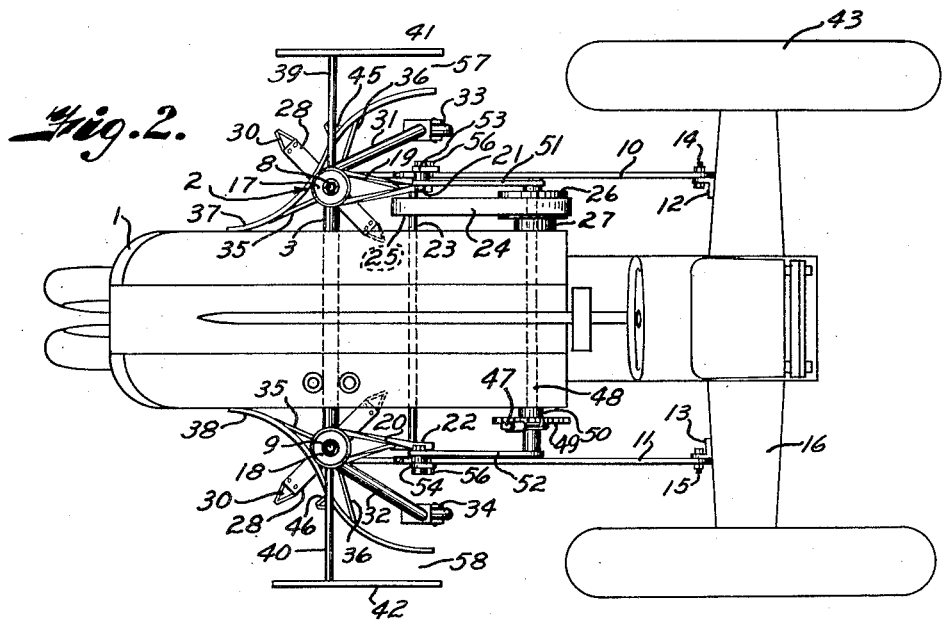
Fig. 2 is a top plan view of the device attached to the tractor.

Mounted upon the upper ends of the shafts 8 and 9 are pulleys 17 and 18 adapted to be driven by belts 19 and 20 operating over pulleys 21 and 22 mounted upon a transverse shaft 23 which shaft is rotated by means of a belt 24 operating over a pulley 25 from the shaft 23 and a pulley 26 on a power take off 27 of the tractor 1 as best illustrated in Fig. 2.

The lower ends of shafts 8 and 9 are threaded and adapted to receive cutting arms 28 which are held on the shaft by nuts 29, the arms being rotatable with the shafts 8 and 9. Mounted on the respective ends of the arms are cutting blades 30 or the arms may have their ends sharpened to provide cutting blades if desired.

The sleeves 6 and shafts 8 and 9 are preferably mounted at an angle or slope so that the blades are closer to the ground at the forward side of their arcuate travel than the rear side thereof as best illustrated in Fig. 1, so as to have the cutting action at the forward arcuate travel of the blades to throw the vine outwardly to be engaged by the guide means as will presently be described.

Secured to the collars 5 by welding or other suitable means are outwardly and downwardly extending arms 31 and 32 provided on their outer ends with caster wheels 33 and 34 for supporting the framework for the blades as the tractor is propelled over the ground, and to prevent the cutters from digging into the ground should the surface of the ground be uneven.

Rigidly mounted on the sleeves 6 by arms 35 and 36 are guide members 37 and 38 formed in substantially an S-curve, the forward end of which extends forwardly of the cutting blade and substantially equal distance to the inner arcuate circle of said blade. Arms 39 and 40 are rigidly mounted on the sleeves 6 and extend outwardly from the transverse bar 3 and mounted on the end thereof are baffles 41 and 42 to prevent the vines from spreading outwardly away from the front of the rear wheels 43 of the tractor.

The S-curved guide members 37 and 38 have their underside cut away forming recesses 44 as illustrated in Fig. 3 to allow for movement of the sloping blades around the arcuate path of travel.

Mounted in the cutout or recess portion 44 of the guides are knives or blades 45 and 46 which are provided to cut the vines as the cutting blades 30 move them outwardly and backwardly and thus prevent winding of the vines around the shaft and its housing.

In order to adjust the height of the cutting arms 28 with their blades 30 a hand lever 47 is mounted on a shaft 48 extending underneath the tractor and the lever is connected to an arcuate rack 49 which in turn is rigidly connected to a collar 50 secured to the frame of the tractor. The lever includes the usual latching mechanism for engaging the rack. On the outer end of the shaft 48 are mounted forwardly extending arms 51 and 52 and having their forward ends pivotally connected to links 53 and 54 having their lower ends provided with slots 55, adapted to receive bolts or the like 56 secured to the forward end of the arms 10 and 11 as best illustrated in Fig. 1. The slots in the links will provide for automatic lifting or lowering of the blade from the ground when there is a tendency of the blade to dig in the ground. The caster wheels will also prevent digging of the blade in the ground should the tractor drop in a hole or to an uneven place on the surface of the ground. By manipulating the lever in Fig. 2, the height of the blades from the ground may be adjusted.

Operation of a device constructed and assembled as described is as follows:

The tractor may be driven straddling over two rows of potatoes or other vine growing objects. Operation of the power take off connected to the shaft 23 will rotate the pulleys on the shaft and through the belt connection with the pulleys on top of the substantially vertical cutter shafts will cause the cutters to rotate. The shaft 8 rotates in an anti-clockwise direction so that the blades thereon will rotate to cut and throw the cut vines outwardly from the tractor so they will be engaged by the guides 37. The shaft 9 is rotated in a clockwise direction so that the blades thereon will cut the vines and pull them outwardly from the tractor so that they will be engaged by the guides 38 to move them outwardly to substantially between the rows of potatoes or the like. The baffles 41 and 42 will prevent vines from being scattered and the vines will pass through the spaces between the guides and baffles as indicated at 57 and 58 (Fig. 2) and will then be run over by the wheels of the tractor. Manipulation of the lever will raise or lower the cutting blades with respect to the ground.

It will be obvious from the foregoing that I have provided an improved vine cutter which will cut the vines from the rows and deposit them between the rows where they may be run over and mashed down by the wheels of the tractor.

What I claim and desire to secure by Letters Patent is:

1. A device of the character described comprising, a frame including a transverse bar and parallel side rails having their forward ends attached to said bar and their rear ends to a tractor, vertical housings carried by the respective ends of said bar, shafts rotatably mounted in said housings, oppositely directed cutter arms fixed on the lower ends of said shafts for rotation therewith, blades fixed on the ends of said cutter arms, means for rotating said blades in opposite directions and moving cut vines outwardly from the tractor, guide means carried by the frame outwardly of the cutter arms for directing the cut vines into the path of the rear wheels of the tractor, a knife on each guide means for cutting vines from the cutter arms to prevent said vines from winding around the respective shafts, and means engaging the ground to the rear and laterally of the cutter arms for raising and lowering the forward end of said frame to maintain the blades in position relative to the ground for cutting the vines.

2. A device for cutting vines in parallel rows comprising, a frame adapted to be attached to a tractor having a power take-off, said frame including parallel arms pivotally mounted on the rear axle of the tractor, housings secured on the forward ends of the arms, a transverse bar secured to said housings, sleeves in said housings having bearing members therein, shafts rotatable in said sleeves, oppositely directed cutting blades fixed on the lower ends of each of said shafts for rotation therewith, means connected to the power take-off of the tractor for rotating said cutters in opposite directions for cutting and conveying the vines outwardly from the tractor, guide plates carried by said housings and curved outwardly of the cutting blades for deflecting the cut vines into the path of the rear wheels of the tractor, a knife on each of the guide plates for cutting vines from the cutting blades to prevent said vines from winding around the respective shafts, caster wheels mounted on the housings and engaging the ground to the rear and laterally of the cutting blades for supporting said frame, and means for adjusting the lower limit of movement of the forward ends of the arms and the cutting blades thereon with respect to the surface of the ground.

3. A device for cutting vines in parallel rows comprising, a frame adapted to be attached to a tractor, said frame including pivotally mounted forwardly extending arms, housings secured on the forward ends of the arms, a transverse bar secured to said housings, shafts rotatably mounted in said housings, oppositely directed cutting blades fixed to the lower ends of each of said shafts for rotation therewith, means for rotating said cutter blades in opposite directions for cutting and conveying the vines outwardly from the tractor, guide plates carried by said housings and curved outwardly of the cutting blades for deflecting the cut vines toward the path of the rear wheels of the tractor, a knife on each of the guide plates for cutting vines from the cutting blades to prevent said vines from winding around the respective shafts, and means mounted on the housings and engaging the ground at the rear and laterally of the cutting blades for supporting the forward ends of the arms with respect to the surface of the ground.

MILLARD D. McCOY.

REFERENCES CITED

The following references are of record in the file of this patent:

UNITED STATES PATENTS

| Number | Name | Date |
|---|---|---|
| 1,323,498 | Scranton | Dec. 2, 1919 |
| 2,203,198 | Junge | June 4, 1940 |
| 2,308,392 | Roepke | Jan. 12, 1943 |
| 2,358,400 | Kiest | Sept. 19, 1944 |
| 2,483,683 | Wells et al. | Oct. 4, 1949 |

FOREIGN PATENTS

| Number | Country | Date |
|---|---|---|
| 242,917 | Germany | Mar. 4, 1910 |